United States Patent [19]

Vossos

[11] 3,855,145
[45] Dec. 17, 1974

[54] PREPARATION OF CONCENTRATED SILICA ORGANOSOLS

[75] Inventor: Peter H. Vossos, Lisle, Ill.

[73] Assignee: Nalco Chemical Company, Chicago, Ill.

[22] Filed: Oct. 31, 1972

[21] Appl. No.: 302,631

Related U.S. Application Data

[63] Continuation-in-part of Ser. No. 110,582, Jan. 28, 1971, abandoned.

[52] U.S. Cl. ............... 252/309, 106/287 S, 252/317
[51] Int. Cl. ............................................. B01j 13/00
[58] Field of Search ...................................... 252/309

[56] References Cited
UNITED STATES PATENTS 2,974,105   3/1961   Iler ........................................ 252/309
3,342,747   9/1967   Mindick et al. ................. 252/313 S Primary Examiner—Richard D. Lovering
Attorney, Agent, or Firm—John G. Premo; James F. Lambe; John S. Roberts, Jr.

[57] ABSTRACT

Silica organosol compositions comprising from 50 to 70 percent by weight of silica particles as $SiO_2$, from 0 to 3 percent by weight of water, and from 30 to 50 percent of a water miscible organic alcohol are disclosed. A method for making these silica organosols is also disclosed by utilizing a double deionized silica sol preferably prepared with a 12–24 hour holding time between passes through a cation-anion exchanger.

5 Claims, No Drawings

PREPARATION OF CONCENTRATED SILICA ORGANOSOLS

INTRODUCTION

This application is a continuation in part of application Ser. No. 110,582, filed Jan. 28, 1971, now abandoned, entitled "Concentrated Silica Organosols," in the name of Peter H. Vossos.

Aqueous silica sols and silica organosols are known to those skilled in the art, but there is a need in the art to produce stable concentrated silica organosols from aqueous silica sols. A method is needed to produce stable organosols which contain at least 50 percent by weight of silica particles. Such silica organosols should be stable for a comparatively long time.

Some silica organosols are well known in the art. These organosols are used in lubricating oils and greases, fillers for rubber products, and thickening agents in certain organic systems. Organosols are beneficial in preparing water-repellent or protective coatings for a variety of surfaces such as textiles, plastics, metal, rubber, and similar products.

The organosols known to those skilled in the art have many inherent disadvantages. In Iler U.S. Pat. No. 2,801,185 a method is shown of preparing finely divided colloidal silica dispersed in organic liquids. The process uses aqueous silica sols as starting materials. However, it is necessary to work with dilute aqueous sols and to carry out various reaction steps before the end products are produced. Therefore, it would be a great advantage in the art if there was a method of producing organosols using concentrated aqueous sols and a simple one- or two-step process. These organosols would have to be stable over a long period of time.

There is also a great need in the art to produce an organosol in which the organic solvent has great utility, such as being water miscible and also miscible with a large variety of other organic solvents.

OBJECTS

It is an object of this invention to provide a silica organosol composition. It is a further object of this invention to provide a silica organosol product containing 3 percent or less of water. It is a further object of this invention to provide a relatively easy method of making concentrated silica organosols.

Another object is to provide a silica organosol that is miscible with water and many organic solvents.

THE INVENTION

This invention comprises a silica organosol composition containing from 50 to 70 percent by weight of silica as $SiO_2$, from 0 to 3% by weight of water, and from 30 to 50 percent by weight of a water miscible organic alcohol. Preferably, the silica particles comprise from 60 to 70 percent by weight of the composition. Although the water content can be lower than 1 percent, due to time and expense necessary to achieve this, the water content is preferably from 1 to 3 percent by weight, and even more preferably, from 1.5 to 2.0 percent by weight.

A method of preparing these concentrated silica organosols comprises the steps of:

1. Adding a double deionized silica sol having a silica content of from 50 to 70 percent by weight as $SiO_2$ to a water-miscible organic alcohol;

2. Feeding additional alcohol as a water-alcohol azeotrope is removed by vacuum distillation; and 3. Recovering the silica organosol product.

Preferably, the double deionized silica sol has a silica content of from 50 to 60 percent by weight of $SiO_2$. Initially some of the water-miscible organic alcohol is placed in the reaction vessel. The double deionized concentrated silica sol can be either added before, after, or with the water-miscible organic alcohol. During the vacuum distillation as the water and the alcohol are removed azeotropically, additional alcohol is fed to the reaction vessel. The vacuum distillation should occur over a relatively short time, preferably from 10 minutes to 4 hours. Distillation occurs at a temperature of from 50° to 100° C. The additional alcohol replaces the azeotrope that is removed by the vacuum distillation.

Vacuum distillation is critical to the practice of this invention; without vacuum distillation a precipitate results. From 20 to 110 percent by weight of additional alcohol based on the weight of the initial alcohol is fed into the reaction vessel. The final silica organosol product preferably contains from 50 to 70 percent silica by weight as $SiO_2$.

WATER-MISCIBLE ORGANIC ALCOHOLS

The water-miscible organic alcohols used in the processes of this invention are primary monohydric alcohols which may also contain an ether linkage. These alcohols act as carriers for the silica particles after the removal of the water.

These water-miscible alcoholic liquids have a boiling point greater than 50° C, with the prefered alcohols having a boiling point greater than 90° C. They may be characterized by the following structural formula:

$$RO-(CH_2CH_2O-)_nH$$

where R is a hydrocarbon radical of from one to four carbon atoms in chain length and $n$ is an integer of from 0 to 1 in value, with the proviso that if $n$ is O, R will contain no more than three carbon atoms.

Preferred alcohols corresponding to the structural formula are the well-known "Cellosolve" alcohols. Examples of the Cellosolve type alcohols are 2-methoxy ethanol, 2-ethoxy ethanol, 2-propoxy ethanol, and 2-butoxy ethanol. These latter compounds are better known are methyl Cellosolve, ethyl Cellosolve, propyl Cellosolve, and butyl Cellosolve. They may be generically classified as glycol ethers. These glycol ethers or Cellosolve compounds correspond to structural Formula No. 1 where $n$ is equal to 1 and the number of carbon atoms in R equals from one to four. Of these, the most preferable is 2-ethoxy ethanol. The most preferred glycol ether is ethylene monoethyl ether.

The structural formula also corresponds to lower alkyl alcohols such as methanol, ethanol, and n-propanol. Of these, the most preferred is n-propanol.

STARTING AQUEOUS SILICA SOLS

Generally, an aqueous silica sol is used for this invention. These are well known to the art. The starting aqueous silica sol can range from 20 to 60 percent by weight of discrete, dense colloidal particles of amorphous silica. The average particle diameter can range from 3 to 150 millimicrons and can have an average surface area from 20 $M^2/g$ to 1,000 $M^2/g$. It is preferred that the starting aqueous silica sol be from 30 to 50 percent by weight of discrete, dense colloidal particles of amorphous silica. The preferred particle diameter should range from 17 to 25 millimicrons and have an average surface area from 120 to 176 M²/g. The following is a table of commercially available aqueous silica sols. These are sold by Nalco Chemical Company under the Trademark Nalcoags.

TABLE I

| Nalcoag | 1030 | 1034A | 1035 | 1050 | 1060 | 1130 | 1140 |
|---|---|---|---|---|---|---|---|
| % Colloidal Silica, as $SiO_2$ | 30% | 34% | 35% | 50% | 50% | 30% | 40% |
| pH | 10.2 | 3.1 | 8.6 | 9.0 | 8.5 | 10 | 10 |
| Avg Particle Size, millimicrons | 11–16 | 16–22 | 16–22 | 17–25 | 40–60 | 8 | 15 |
| Avg Surface Area, M²/gram | 190–270 | 135–190 | 135–190 | 120–176 | 50–75 | 375 | 200 |
| Specific Gravity at 68°F | 1.205 | 1.230 | 1.255 | 1.385 | 1.390 | 1.214 | 1.296 |
| Viscosity at 77°F cps | less than 5 | less than 5 | 5 | 70 | 5–10 | 7 | 8 |
| $Na_2O$ % | 0.40% | less than 0.01% | 0.10% | 0.30% | 0.10% | 0.65% | 0.40% |

THE DOUBLE DEIONIZED SILICA SOL

The silica sol that was used in the following examples was Nalcoag 1050, which is listed in the above table. Nalcoag 1050 contained 50 percent colloidal silica as $SiO_2$; pH was 9.0; the average particle size was 17 to 25 millimicrons; the average surface area was 120 to 176 M²/g; the specific gravity at 68°F was 1.385; the viscosity at 77° F was a maximum of 70 cps; and the $Na_2O$ percent was 0.30. This sol was then double deionized as follows.

The starting material is a deionized 50 percent aqueous silica sol which is stable for only a matter of days, but if it is used soon after deionization, it will not gel.

In order to practice the subject matter of this invention, aqueous double deionized silica sols are used as the effective sols. Double deionized silica sols are well known in the art, as U.S. Pat. No. 3,342,747 Mindick et al (Nalco) and U.S. Pat. No. 3,644,213 Vossos (Nalco). The double deionized sol should be a very concentrated sol, preferably 50 percent.

Typically, the sol can be decationized by passing the sol through a column of cation resin in the hydrogen form. The resin could be Nalcite HCR, which is described in U.S. Pat. No. 2,366,007. Following this treatment, the silica sol is passed through a strong base anion exchange resin in the hydroxide form. The resin in this case could be Nalcite SBR, which is described in U.S. Pat. No. 2,591,573. The single deionized sol, after an appropriate holding time of 18–24 hours, is subjected to an additional pass or cycle through the cation-anion exchanger and thus a double deionized silica sol is produced. Broad holding time may be 12–24 hours.

EXAMPLE I 467 milliliters of double deionized 50 percent silica sol from Nalcoag 1050 was placed in a reaction vessel with 133 ml of ethylene glycol monoethyl ether. 1,000 ml of ethylene glycol monoethyl ether was fed into the flask as 1,226 ml of water and alcohol were distilled off azeotropically under a vacuum of close to 24 inches; the temperature rose to 51° C. The temperature leveled off at 79° C. The total time was about 2 hours. The product contained 63% $SiO_2$, was clear and opalescent in appearance, somewhat viscous but stable for more than 10 months.

EXAMPLE II 500 ml of ethylene glycol monoethyl ether was placed in a reaction flask. 467 ml of a double deionized silica sol prepared from Nalcoag 1050 was diluted with 700 ml of ethylene glycol monoethyl ether and fed to the reaction flask over a period of 3 ½ hours. 1,300 ml of distillate was removed under a vacuum of close to 26 inches. The product was very viscous and was more than 65% $SiO_2$. When diluted to 50% $SiO_2$, it was a clear, opalescent, nonviscous, and stable sol.

These organosols are merely dispersions of silica particles in ethylene glycol monoethyl ether. Essentially, no surface esterification or hydrogen bonding has taken place.

In order to determine that no surface esterification has taken place, the product of Example II was diluted to 20% $SiO_2$ and one drop was added to 10 ml of benzene. There was a precipitate of $SiO_2$. Another portion of the 20% $SiO_2$ product was refluxed for over 6 hours at the boiling point of the solvent (about 130° C) to achieve surface esterification. One drop of this sol was placed in benzene and gave a clear solution, indicating esterification.

EXAMPLE III — COMPARATIVE

In another experiment, 567 milliliters of Nalcoag 1050 that was not double deionized was placed in a reaction vessel with 33 milliliters of ethylene glycol monoethyl ether. Additional ethylene glycol monoethyl ether was fed into the reaction vessel as the water was removed azeotropically. A precipitate began to form when the temperature reached 105° C, and when the temperature reached 115°C, most of the silica had precipitated.

The above example demonstrates the need for double deionization of the starting aqueous sol as well as vacuum technique during the process.

The organosol product of this invention is stable, but the addition of large amounts of water cause precipitation. When the water content is above about 5 percent to about 25 percent, precipitation occurs at temperatures below 100° C. The reason that precipitation does not occur during the vacuum distillation preparation of the organosols when the water content falls within this range is because the total time is short. The vacuum distillation occurs rapidly. Therefore, the time that the sol contains from 5 to 25 percent water is relatively short and thus precipitation does not occur.

In order to show that esterification did not take place any standard method of determining esterification could be used.

The degree of esterification may be determined according to methods detailed in U.S. Pat. No. 2,657,149. Determination may also be made by diluting a measured sample of finished sol to make a 1 percent aqueous solution and then titrating to end point with a 10 percent aqueous sodium hydroxide solution in the presence of phenolphthalein or methyl orange indicator. Determination by either of these methods shows sols produced by the process disclosed here to have silica particles with substantially none of their surface silanol groups esterified.

EXAMPLE IV — COMPARATIVE

A comparison was made between the double deionization starting material of the present invention and the single deionization process as set out in U.S. Pat. No. 2,974,105 Iler (duPont).

A mixture of 1:1 Cellosolve and 30% $SiO_2$ sol was added to a heel of boiling Cellosolve, maintaining a constant pot volume until the water was driven off. After the water was removed, the sol was then concentrated.

Four samples were prepared from a deionized sol with varying pH and $Na_2O$ concentration.

Sample 1: Single deionized 1050

Nalcoag 1050 at 50% $SiO_2$, 20 mu particle diameter, was deionized by passing the sol through an excess of HGR-W[H⁻] and SBR[OH⁻] resin. The sol was then diluted to 30% $SiO_2$ with DI water. Three-hundred milliliters of the 30% DI sol and 300 ml of Cellosolve were mixed, pH being 3.6. This was added to a boiling, 500 ml Cellosolve heel, maintaining a constant pot volume until the water was removed. The sol was then concentrated to 50% $SiO_2$, under vacuum.

Sample 2: Single deionized 1050 — Realkalized

The $SiO_2:Na_2O$ ratio of the deionized sol described in Sample 1 was adjusted to 700:1 with 0.1N NaOH. To 300 ml of this sample was added 300 ml of Cellosolve. The resulting pH was 7.1. This was added to a boiling heel of 500 ml Cellosolve. Attempts to remove the water with direct heating resulted in gelation of the product. It was necessary that both the water removal and concentration be carried out under vacuum in order to obtain a stable product.

Sample 3: Single deionized 1050 — acidified

The 1:1 sol-Cellosolve mixture described in Sample 1 was adjusted to a pH of 2.5 with $H_2SO_4$. The same procedure was followed in removing the water and concentrating the sol as in Sample 1.

Sample 4: Double deionized 1050

The deionized 1050 prepared in Sample 1 was allowed to sit overnight and was then again passed through an excess of cation and anion resin. This was diluted to 30% $SiO_2$ and a 1:1 mixture with Cellosolve was made, the pH being 3.0. The organosol was prepared in the same manner as Sample 1. Stability of the samples was measured by determining gel times at 140° F. The results are listed below:

|  |  | Gel Time (days) |
|---|---|---|
| Sample 1 | DI-1050 | 23 |
| Sample 2 | DI-1050-Realkalized | 11 |
| Sample 3 | DI-1050-Acidified | 23 |
| Sample 4 | DI-1050 | 34 |

The comparative stability was apparent by the gelation time of Sample 4 above.

SUMMARY

This method of preparing silica organosol compositions comprises a fast, simple solvent displacement process. Evaporation of the water must take place at a reduced temperature under vacuum while the solvent is being added. Sols of lower concentration could be used via the same process beginning with diluted deionized sols and then concentrated under vacuum to greater than 50% $SiO_2$. However, this process takes much longer in time and requires more solvent. Therefore, it is preferred to use an aqueous deionized silica sol containing at least 50% $SiO_2$.

Thus, using a highly concentrated aqueous double deionized silica sol prepared with a 12–24 hour holding time between passes through a cation-anion exchanger, a water-miscible organic alcohol and vacuum distillation, an organosol can be prepared in a very short time.

The embodiments of this invention in which an exclusive property or privilege is claimed are defined as follows:

1. A method of preparing a concentrated silica organosol which comprises the steps of:
   A. passing a silica sol containing 20–60 percent colloidal particles of amorphous silica through a cation exchange resin in the hydrogen form and a strong base anion exchange resin in the hydroxide form to produce a single deionized sol and after a holding time of 12–24 hours passing said single deionized sol through a cation exchange resin and an anion exchange resin to produce a double deionized silica sol having a $SiO_2$ content of from 50 to 70 percent by weight;
   B. adding said double deionized silica sol to a reaction vessel containing a water-miscible organic alcohol; feeding additional water-miscible organic alcohol as a water alcohol azeotrope is removed by vacuum distillation at a temperature below about 100° C; and recovering the silica organosol product.

2. The method of claim 1 wherein the double deionized silica sol has a $SiO_2$ content of from 50 to 60 percent by weight.

3. The method of claim 1 wherein the distillation temperature ranges from 50° to 100° C.

4. The method of claim 1 wherein the reaction vessel contains from 20 to 80 percent by weight of ethylene glycol monoethyl ether based on the water present in the double deionized silica sol.

5. The method of claim 1 wherein the holding time is 18–24 hours.

* * * * *